(12) United States Patent
Bruck et al.

(10) Patent No.: US 10,228,709 B2
(45) Date of Patent: Mar. 12, 2019

(54) PRESSURE-LIMITING VALVE (71) Applicant: HYDAC FLUIDTECHNIK GMBH, Sulzbach/Saar (DE)

(72) Inventors: Peter Bruck, Althornbach (DE); Martin Grill, St. Wendel (DE)

(73) Assignee: HYDAC FLUIDTECHNIK GMBH, Sulzbach/Saar (DE)

( * ) Notice: Subject to any disclaimer, the term of this patent is extended or adjusted under 35 U.S.C. 154(b) by 0 days.

(21) Appl. No.: 15/547,560

(22) PCT Filed: Jan. 9, 2016

(86) PCT No.: PCT/EP2016/000038
§ 371 (c)(1),
(2) Date: Jul. 31, 2017

(87) PCT Pub. No.: WO2016/128104
PCT Pub. Date: Aug. 18, 2016

(65) Prior Publication Data
US 2018/0024577 A1    Jan. 25, 2018

(30) Foreign Application Priority Data
Feb. 11, 2015    (DE) .................. 10 2015 001 755

(51) Int. Cl.
*F16K 17/06* (2006.01)
*G05D 16/10* (2006.01)
(Continued)

(52) U.S. Cl.
CPC .......... *G05D 16/106* (2013.01); *F15B 13/024* (2013.01); *F16K 1/42* (2013.01);
(Continued)

(58) Field of Classification Search
CPC ...... F16K 15/026; F16K 31/1221; F16K 1/42; F16K 31/408; F16K 17/0433;
(Continued)

(56) References Cited

U.S. PATENT DOCUMENTS 2,041,906 A * 5/1936 Czarnecki ............. F16K 17/044
137/115.01
2,804,881 A * 9/1957 Seid ........................ F16K 15/18
137/493
(Continued)

FOREIGN PATENT DOCUMENTS

DE   25 47 646    4/1977
DE   30 45 360    7/1982
(Continued)

OTHER PUBLICATIONS

International Search Report (ISR) dated Apr. 6, 2016 in International (PCT) Application No. PCT/EP2016/000038.
(Continued)

*Primary Examiner* — Minh Le
(74) *Attorney, Agent, or Firm* — Wenderoth, Lind & Ponack, L.L.P.

(57) ABSTRACT

A pressure-limiting valve with feed function includes a valve housing (20) having a working connection (A) and a tank connection (T). A spring-loaded pressure-limiting valve piston (22) is mounted and longitudinally movable in the valve housing (20). A spring-loaded non-return valve piston (56) for the implementation of the feed function is designed as a hollow piston and is mounted to be longitudinally movable in the valve housing (20).

15 Claims, 5 Drawing Sheets

(51) Int. Cl.
*F15B 13/02* (2006.01)
*F16K 1/42* (2006.01)
*F16K 17/04* (2006.01)
*F16K 31/40* (2006.01)
*F16K 15/02* (2006.01)
*F16K 31/122* (2006.01)
*F15B 13/04* (2006.01)
*F15B 20/00* (2006.01)
*F15B 21/047* (2019.01)

(52) U.S. Cl.
CPC ........ F16K 15/026 (2013.01); F16K 17/0433 (2013.01); F16K 31/1221 (2013.01); F16K 31/408 (2013.01); *F15B 13/0405* (2013.01); *F15B 20/007* (2013.01); *F15B 21/047* (2013.01)

(58) Field of Classification Search
CPC ... G05D 16/106; F15B 21/047; F15B 20/007; F15B 13/0405; F15B 13/024
USPC ............ 137/492.5, 491, 493.1, 493.2, 496.6, 137/493.7, 512.2
See application file for complete search history.

(56) References Cited

U.S. PATENT DOCUMENTS

| | | | | |
|---|---|---|---|---|
| 2,917,072 A | * | 12/1959 | Saville | F16K 17/0426 137/469 |
| 3,036,593 A | * | 5/1962 | Saville | F16K 17/0426 137/469 |
| 3,054,420 A | * | 9/1962 | Williams | F16K 17/0426 137/469 |
| 3,583,431 A | | 6/1971 | Diel et al. | |
| 3,980,095 A | * | 9/1976 | McAvoy | F15B 11/05 137/115.1 |
| 4,476,890 A | * | 10/1984 | Kawasaki | F16K 17/105 137/269 |
| 4,548,231 A | * | 10/1985 | Schwede | F15B 21/047 137/491 |
| 6,805,155 B2 | * | 10/2004 | Slawinski | F16K 17/105 137/489 |
| 8,434,508 B2 | * | 5/2013 | Terada | F16K 17/06 137/115.13 |
| 2015/0107699 A1 | | 4/2015 | Hilzendegen et al. | |
| 2015/0219124 A1 | * | 8/2015 | Kim | F15B 13/029 60/371 |
| 2016/0076557 A1 | * | 3/2016 | Zaehe | F15B 13/015 137/492.5 |
| 2017/0284277 A1 | * | 10/2017 | Wardle | F01P 3/08 |

FOREIGN PATENT DOCUMENTS

| | | |
|---|---|---|
| DE | 10 2009 053 918 | 5/2011 |
| DE | 10 2012 010 522 | 11/2013 |
| DE | 10 2013 014 673 | 3/2015 |
| KR | 10 2013 0040553 | 4/2013 |

OTHER PUBLICATIONS

Anonymous: "Liste der Schaltzeichen (Fluidtechnik)—Wikipedia", Dec. 10, 2015, pp. 1-11, XP055261892, Retrieved from the Internet: URL:https://de.wikipedia.org/wiki/Liste-der_Schaltezeichen_%28Fluidtechnik%29 [retrieved on Mar. 31, 2016].

* cited by examiner

PRESSURE-LIMITING VALVE

FIELD OF THE INVENTION

The invention relates to a pressure-limiting valve with a feed function and comprises a valve housing having at least two connection points, in particular in the form of a work port A and a tank port T. A spring-loaded pressure-limiting valve piston is guided in a longitudinally displaceably manner in the valve housing. A spring-loaded check-valve piston is provided for implementing the feed function.

BACKGROUND OF THE INVENTION

Appropriate valves are used in power hydraulics as shock valves. The valves safeguard the pressure between the Main Control Valve (MCV) and a power cylinder or hydro motor. Thus, even if the MCV is switched off, the respective cylinder is protected in the case of shocks acting on the devices or machines from the outside.

The valve can also be used to provide individual maximum pressure relief, which can be lower than the system pressure. For that reason, the valves are installed in pairs on the A and B sides of the directional control valves (MCV). If a valve responds to a shock load, a volume flow from the hydraulic cylinder (engine) is drained into the tank, and the cylinder evades the overload. To prevent cavitation in the hydraulic system and the connected valve and machine equipment, the opposing shock valve acts as a check valve and permits the oil to be sucked back out of the volume in the tank. In the state of the art (cf. the valve solution RD18329-32/11.10 by Bosch Rexroth Group published online in December 2014), direct-controlled installation kit valves are usually used.

In the case of these comparable valves, the valve seat of the check piston is incorporated in the control block. The seat of the pressure-limiting valve is located inside the movable check piston. If the seat of the check piston is damaged, the entire control block must be replaced, because the seat is part of the block. The pressure-limiting valve piston is relatively small in size because it is inside the check-valve piston. In this way, the flat pressure-limiting characteristic, which is desirable for the function, cannot be achieved. Owing to the design, implementing suitable valve damping is very difficult, resulting in a risk of instabilities in operating the valve.

SUMMARY OF THE INVENTION

Based on this state of the art, the invention addresses the problem of providing a valve design, which is suitable as a shock valve with a pressure-limiting function and which does not have the disadvantages described above.

A pressure-limiting valve that solves this problem according to the invention, has a check-valve piston designed as a continuous hollow piston and guided directly longitudinally in the valve housing. The solution according to the invention can then be designed as a cartridge and can be directly replaced as a whole if the valve seat is damaged. Furthermore, the valve design according to the invention permits having only a single seat, which can, however, open a large cross-section. Thus, flat flow characteristics are possible in both directions, which is relevant for the shock function mentioned. The stress on the components is low even for fast evasive movements.

With the solution according to the invention, the pressure-limiting function can be dampened, allowing for a stable operation. As both the pressure-limiting valve piston and the check-valve piston have no valve cover as part of the function, the valve as a whole reacts extremely quickly to shock-like overload. As a result, virtually no pressure peaks occur during rapid opening as part of the pressure-limiting function.

Other objects, advantages and salient features of the present invention will become apparent from the following detailed description, which, taken in conjunction with the drawings, discloses preferred embodiments of the present invention.

BRIEF DESCRIPTION OF THE DRAWINGS

Referring to the drawings that form a part of this disclosure that are schematic and not to scale.

DETAILED DESCRIPTION OF THE INVENTION

Figures 1, 2:
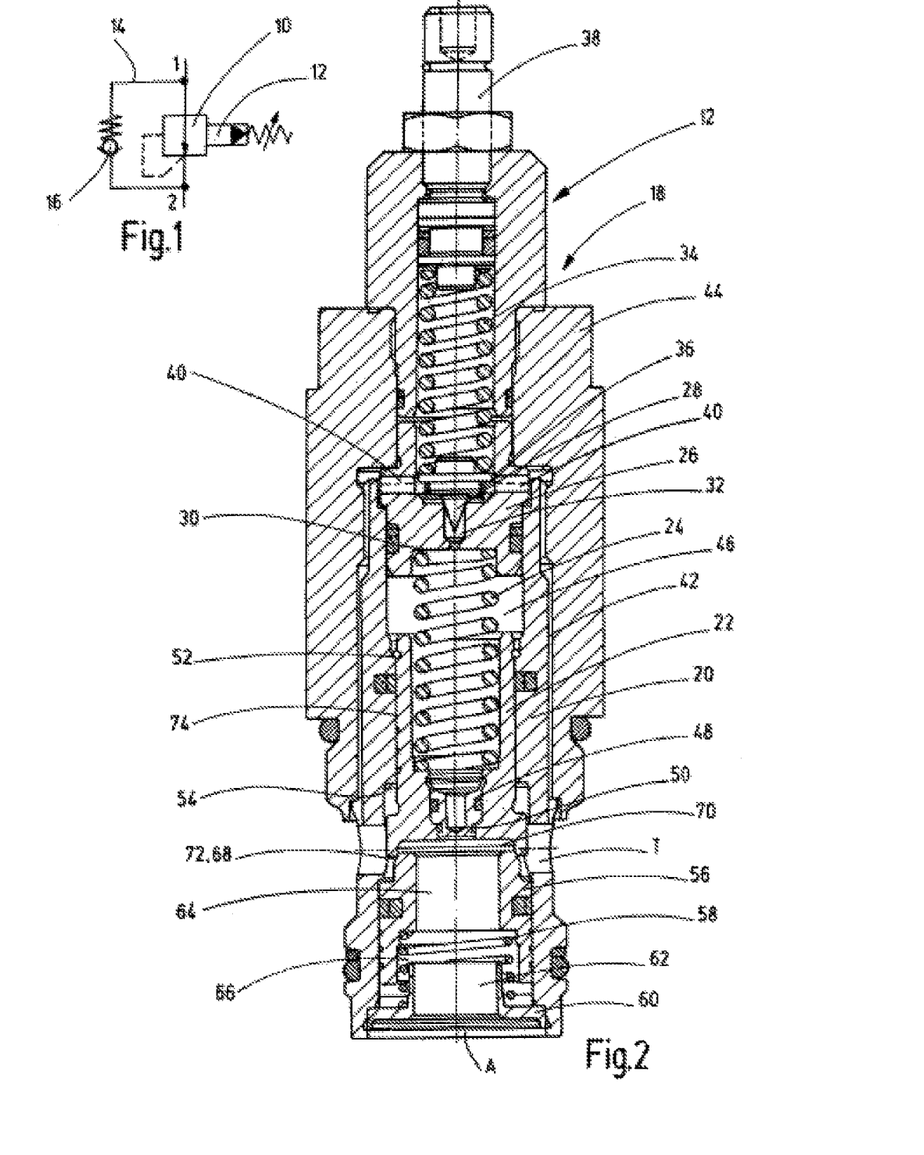
FIG. 1 is a hydraulic functional circuit diagram of the basic structure of a pilot-controlled pressure-limiting valve having a feed function.
FIGS. 2 to 4 are side views in section of a valve according to an exemplary embodiment of the invention in various functional positions of the valve.

FIG. 1 shows in the context of a hydraulic fluid supply a connection from a connection point 1 to a connection point 2. A pressure-limiting valve 10 with a mechanical valve pilot control 12 has been installed between the two points 1, 2. Depending on the pressure setting via the mechanical valve pilot control 12, the pressure-limiting valve 10 opens towards the tank (point 2), as soon as a presettable pressure threshold value is exceeded, to protect the hydraulic circuit, in addition to the machines and equipment connected thereto, from damaging pressure peaks or a correspondingly damaging increase in pressure. A spring-loaded check valve 16, which opens in the direction of the connection point 1 against the action of its return spring, is connected in a bypass line 14 between the connection points 1 and 2. In this way, fluid can be sucked from point 2 if an amount of fluid is missing at point 1, by opening the check valve 16. In case of shock-like pressure increases at point 2, these can also be relieved in the direction of the connection point 1 via the spring-loaded check valve 16.

FIG. 1 then shows in a symbolic circuit depiction a pilot-controlled pressure-limiting valve 10 having a feed function via the spring-loaded check valve 16, in particular for the range of necessary work functions in construction machines (not shown) of conventional design. The valve solution divided into its individual functions in FIG. 1 has been combined in a single cartridge in the valve design according to FIGS. 2 to 4. The cartridge 18 shown in longitudinal section in FIG. 2 has a valve housing 20 equipped with two connection points in the form of a work port A and in the form of a tank port T. The work port A is inserted in the valve housing 20 on the bottom side and in the axial longitudinal direction, as viewed in FIG. 2. The tank port T penetrates the valve housing 20 radially in the form of individual bores. A pressure-limiting valve piston 22 is guided in the valve housing 20 in a longitudinally displaceable manner. The piston 22 is propped or biased by a compression spring 24, acting as an energy storage device. In doing so, the free lower end of the compression spring 24 is propped by or abutted on the piston 22, which has a hollow-bore in this respect. The other or upper end of the compression spring 24, on the other hand, is propped or abutted against the recess of an orifice seat body 26.

The orifice seat body 26 forms a valve seat for a seat cone 28 and has the damping orifice 30 on its underside. The orifice seat body 26 is arranged stationary in the valve housing 20 and is provided with a longitudinal bore 32, which at its upper end has the pilot control seat with the valve seat cone 28. The damping orifice 30 is provided at its opposite lower end of the bore 32. The seat cone 28 is clamped between two compression springs 34, 36 with different spring stiffnesses. The upper compression spring 34 is adjustable with respect to its spring pre-load via a spindle drive 38 in a customary manner, and is therefore not described in detail. If the seat cone 28 is lifted from the orifice seat body 26 against the action of the compression spring 34 due to the pressure conditions in the valve and supported by the additional spring 36 insofar from its pilot control seat (i.e., the orifice seat body 26), a fluid- or medium-conducting connection is opened from the damping orifice 30 via the pilot control seat into transverse ducts 40 in the orifice seat body 26, which in turn transitions into at least one longitudinal channel 42 leading to the tank port T as shown in FIG. 2. To form the respective longitudinal channel 42, the valve housing 20 is encompassed by a cartridge-like additional housing part 44.

The lower end of the longitudinal bore 32 opens into a spring space 46 comprising the compression spring 24 of the pressure-limiting valve piston 22 via the damping orifice 30. In FIG. 2, that piston 22 is closed on its bottom by a plug 48, which plug is radially penetrated by a pilot control orifice 50, which orifice is in fluid-conducting connection with the service port or work port A in every displacement position of the piston 22. The piston 22 itself is guided within the valve housing 20 between an upper travel stop 52 and a lower travel stop 54. The piston 22 abuts against the upper travel stop 52, which, just like the lower travel stop 54, is formed by housing parts of the valve housing 22, as shown in FIG. 2. The illustration according to FIG. 4, on the other hand, shows the piston 22 in its upper stop position against the lower travel stop 54.

The valve construction according to FIG. 2 has a check-valve piston 56, which on its underside is supported by a compression spring 58 as an additional energy storage device. The piston 56 is designed as a hollow piston and is guided along its outer circumference at least partially along the inner side of the valve housing 20. One free upper end of the compression spring 58 is supported by a step in the piston 56. The other lower end of compression spring 56 is supported at an end part 60 with a central opening 62. Central opening 62 forms a permanent fluid guide from the work port A into the cylindrical interior 64 of the piston 56.

In accordance with FIG. 2, both the pressure-limiting valve and the check valve are in their closed positions, in which the end face region of the pressure-limiting valve piston 22 is in contact with the assignable end wall region of the check-valve piston 56. Correspondingly, the fluid-conducting connection between the service port A and the tank port T is blocked or disabled. For the purpose of enabling this fluid-conducting connection between the work port A and the tank port T, the two pistons 22, 46 have to move away from one another relative to each other and in the axial longitudinal direction of the valve body, as will be explained in more detail below. While the resetting spring 24 for the pressure-limiting valve piston 22 is mounted in the mounting space or spring space 46, the resetting or compression spring 58 for the check-valve piston 56 is mounted in the additional mounting space or spring space 66, which extends between the end part 60 and the bottom of the piston 56.

For a desired seat-tight connection of the pistons 22, 56 with each other, the check-valve piston 56 is provided with an inclined surface 68, which engages in a cylindrical receiving space 70 on the end face of the pressure-limiting valve piston 22. The pressure-limiting valve piston 22 then represents the main stage of the pilot controlled pressure-limiting valve. The diameter of the seat edge 72, formed by the inclined surface 68 is equal to the diameter of the piston shaft 74 of the piston 22 in order to enable a functionally reliable operation in terms of the sketch. In FIG. 2, the piston 22 is already shown in its regulating position in contact with its upper travel stop 52, this only affecting the limit case stop. The regulation can obviously be effected between the pistons 22 and 56, if the piston 22 moves out of its travel stops, in this case the upper travel stop 52. The further functional description is based on the last-mentioned case of the positioning of the piston 22.

Figure 3:
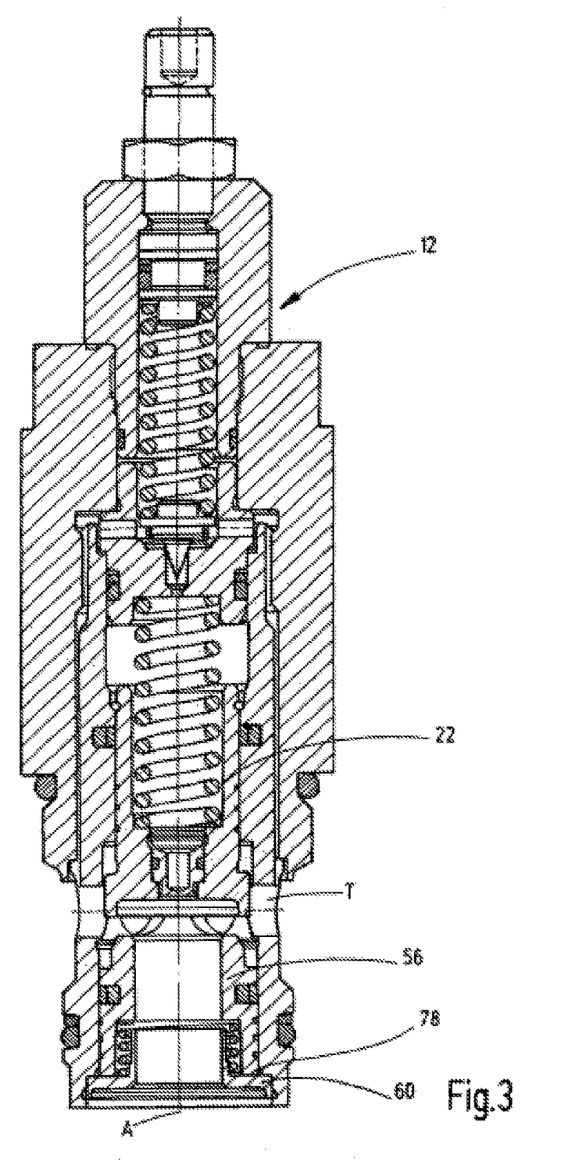

FIG. 3 relates to such a regulating position, in which the check valve reaches an opening position, in which a fluid-conducting connection between the work port A and the tank port T is attained. The check valve function named is achieved in that the pressure at the service or work port A (=point 1 in FIG. 1) is lower than at the tank port T (=point 2 in FIG. 1). The check-valve piston 56 moves downwards in the direction of FIG. 3, into its opening position. The assigned compression spring 58 is then tensioned. If the pressure-limiting valve piston 22 has not yet reached the upper travel stop 52, the piston 22 always follows the movement of the piston 56 until this upper travel stop 52 has been reached, as illustrated in FIG. 3. Overall, the two pistons 22, 56 separate from each other in axial direction, thereby enabling the fluid guide between the work port A and the tank port T. In this way, the feed function is achieved via the opening of the check-valve piston 56.

Figure 4:
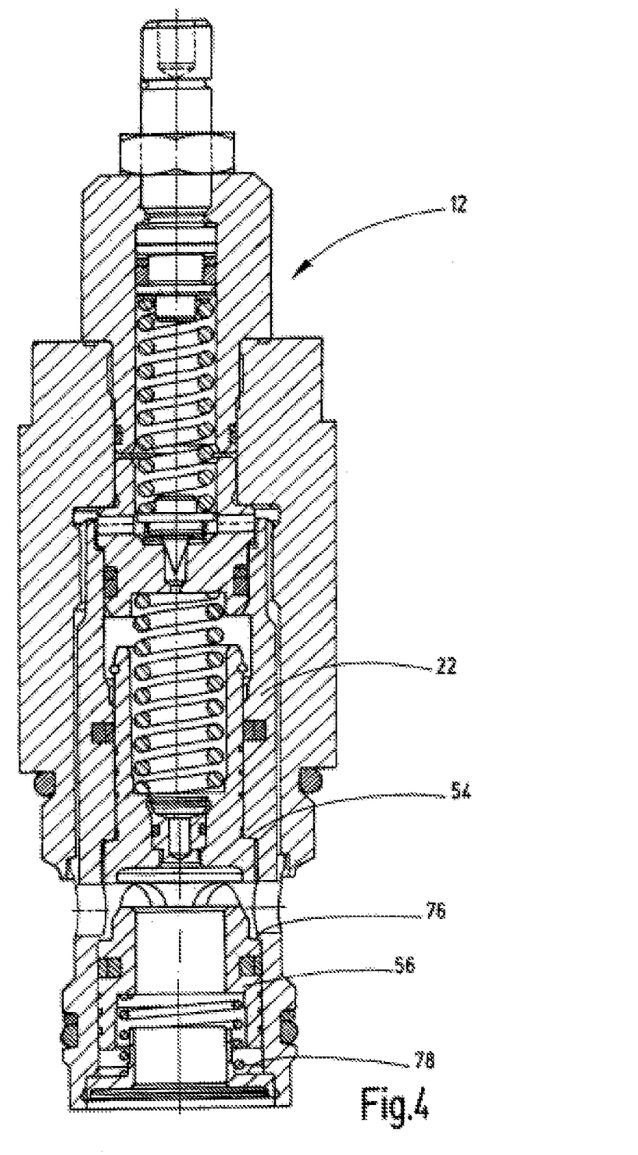

FIG. 4 shows the equally possible pressure-limiting function besides the check-valve function or feed function. If the pressure at the work port A is too high, the valve pilot control 12 opens, and a stream of pilot-control oil flows, which builds up a pressure difference at the pilot control orifice 50. Because of the different pressures upstream and downstream of the pressure-limiting valve piston 22, it arrives at a high piston position until it reaches its lower travel stop 54. In this case too, the check-valve piston 56 follows the movement of the pressure-limiting valve piston 22 upwards until the piston 56 reaches its upper travel stop 76 as shown in FIG. 3 after it had assumed its lower travel stop 78 there, as shown in FIG. 3, where it abuts against the upper side of the end part 60. In this respect as well, both pistons 22, 56 are again separated from one another in axial direction, but now with the option that, owing to the free travel of the piston 22 against the action of the compression spring 24, that piston 22 acts as a pressure limiter for the fluid-conducting connection between the work port A and the tank port T.

As can be seen from FIGS. 2 to 4, the entire valve is formed as a cartridge. If the seat edge 72 of the valve seat is damaged, the valve as a whole can be exchanged for a new valve, which exchange is particularly cost-effective because long downtimes of the hydraulic circuit of the machine can be avoided. The inclined surface 68, which, with the seat edge 72, forms the valve seat between the two pistons 22, 56, can open a relatively large cylindrical cross-section, i.e. the desired flat flow characteristics in operation are possible in both directions, from A to T and from T to A. This arrangement results in low stresses on the components even in the case of rapid deflection movements of the two pistons 22, 56, which is extremely important for a good shock function of the valve. The valve design also permits damping of the pressure-limiting function by the pressure-limiting valve piston 22 via the damping orifice 30 in the orifice seat body 26. Since the two pistons 22, 56 are moved towards one another and away from one another on the front side, no valve cover is present in this respect, and the valve can react extremely quickly to shock-like overloads. Then virtually no pressure peaks occur during the rapid opening of the pressure-limiting function when the pressure-limiting valve piston 22 is actuated against the action of its compression spring 24. The opening pressure of the pistons 22, 56 can be chosen very close to the load limit of these components, as in case of application the pressure can barely rise above the opening pressure. In this way, the construction machine or machine can be operated close to the load limit of its mechanical components.

Figure 5:
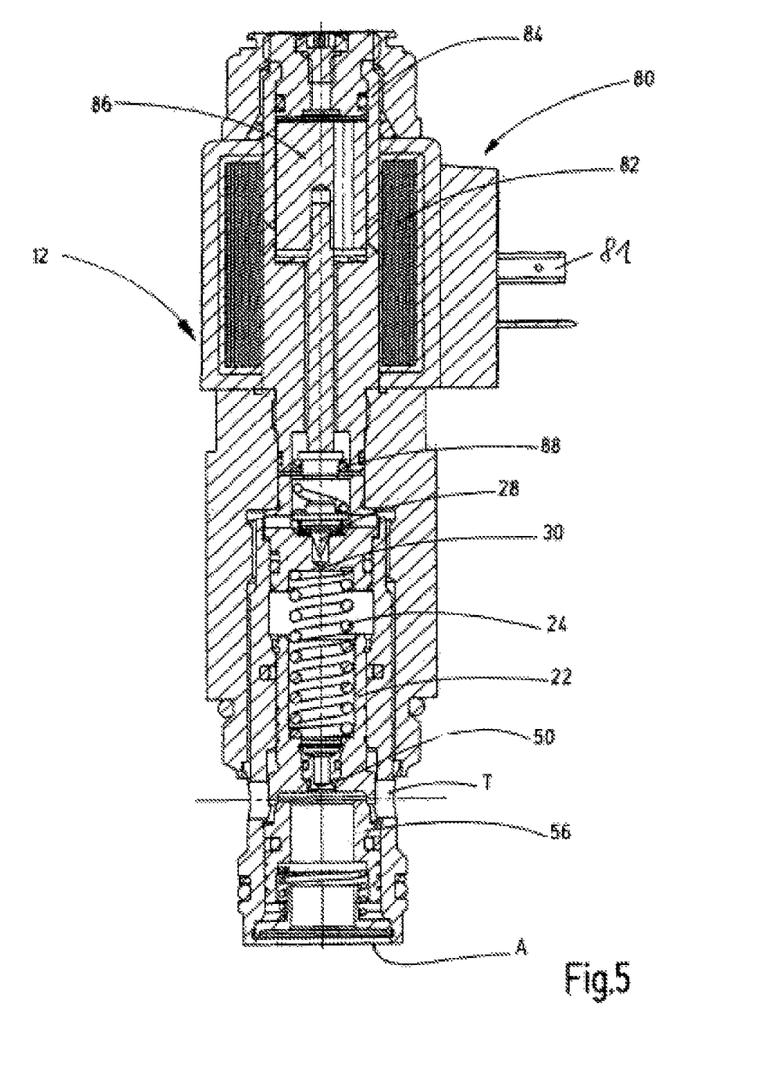
FIGS. 5 and 6 are side views in section of the valve according to the invention having electromechanically formed pilot control.
Figure 6:
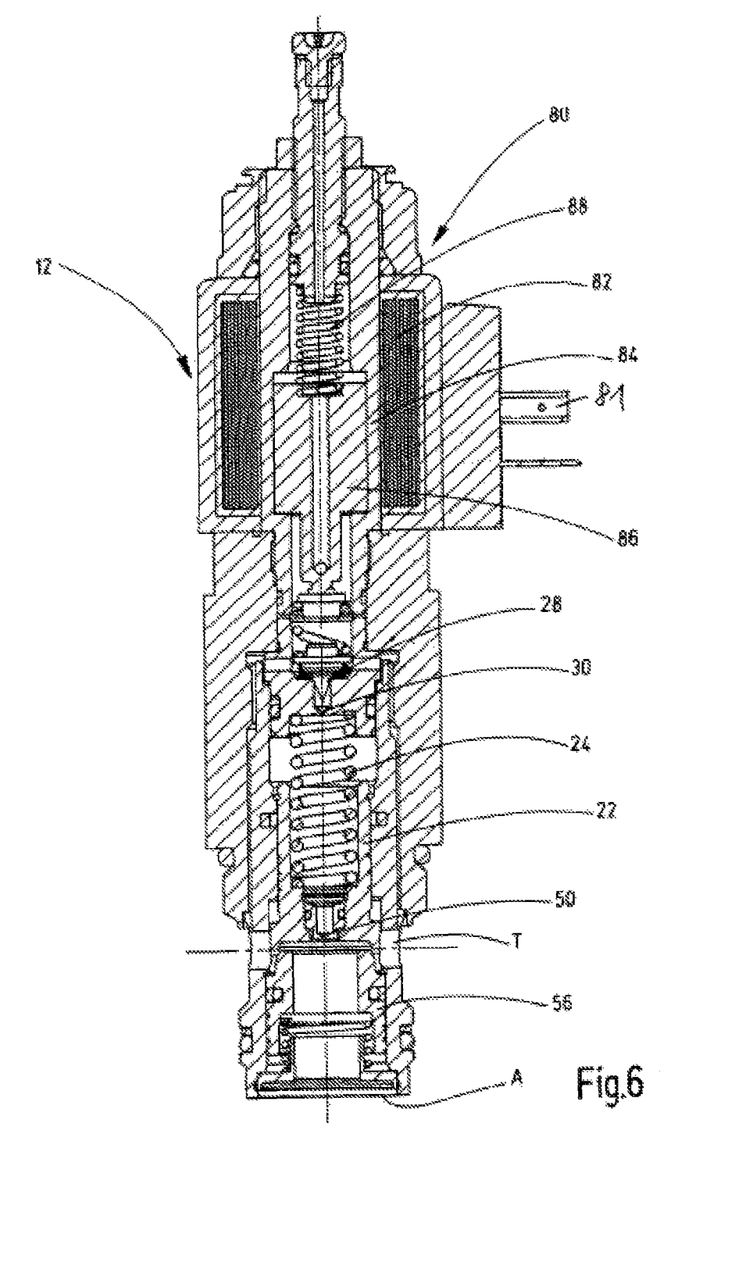

Due to the design, the valve can also be operated "simply" as a proportional valve. In that case the mechanical adjustment (valve pilot control 12) has to be replaced by a magnetic actuator (actuating magnet), permitting the valve to be designed as a valve kit. The valve can then be adapted to the individual maximum pressure of peripherals at any time. There is no equivalent in the prior art. FIGS. 5 and 6 show the valve solution according to the invention by way of longitudinal sectional representations, this time using electromechanical pilot control, one with a "pushing" (FIG. 5) and one with a "pulling" (FIG. 6) actuating magnet system 80. The respective actuation magnet systems 80 have a coil 82, which can be energized via a power connection 81. After the coil has been energized, the keeper 86, which is displaceably disposed in a pole tube housing 84, moves downwards, looking toward FIG. 5, counter to the action of a compression spring 88 or upwards, as viewed in the direction of FIG. 6, to effect the pilot control function of the valve function of the pressure-limiting valve according to the invention, which has already been described. Such magnet systems for controlling longitudinally displaceable valve systems are sufficiently known in the prior art. For that reason no additional details are given here.

While various embodiments have been chosen to illustrate the invention, it will be understood by those skilled in the art that various changes and modifications can be made therein without departing from the scope of the invention as defined in the claims.

The invention claimed is:

1. A pressure-limiting valve with a feed function, comprising:
   a valve housing having a work port and a tank port;
   a spring-loaded pressure-limiting valve piston being longitudinally displaceable in said valve housing and having a cylindrical receiving space on an end face of said pressure-limiting valve piston;
   a spring-loaded check-valve piston capable of implementing a feed function, said check-valve piston being a hollow piston and being longitudinally displaceable in said valve housing; and
   a seat-tight connection of said pistons with each other, said check-valve piston having an inclined surface engaging in said cylindrical receiving space.

2. A pressure-limiting valve according to claim 1 wherein said pressure-limiting valve piston and said check-valve piston are in contact with one another in a region of free, mutually adjacent end faces thereof blocking fluid communication between said work port and said tank port and are movable away from one another separating said end faces in an axial direction providing fluid communication between said work port and said tank port.

3. A pressure-limiting valve according to claim 1 wherein said pressure-limiting valve piston and said check-valve piston each have at least one travel stop within said valve housing and each have a respective setting spring guided in opposing mounting or spring spaces in said valve housing.

4. A pressure-limiting valve according to claim 1 wherein said pressure-limiting valve piston comprises a pilot control orifice establishing a permanent fluid communication between a front and a rear of said pressure-limiting valve piston.

5. A pressure-limiting valve according to claim 1 wherein said pressure-limiting valve piston interacts with a valve pilot control with a damping orifice enabling a fluid communication from a pilot control orifice to said tank port.

6. A pressure-limiting valve according to claim 1 wherein said tank port extends radially into said valve housing; and
said work port extends axially into said valve housing.

7. A pressure-limiting valve according to claim 6 wherein said pressure-limiting valve piston and said check-valve piston contact one another approximately in an area of a bore axis of said tank port blocking fluid communication between said working port and said tank port.

8. A pressure-limiting valve according to claim 3 wherein said check-valve piston is movable in a direction of said tank port and said pressure-limiting valve piston follows movement of said check-valve piston until reaching the respective travel stops, with said check-valve piston enabling fluid communication between said working port and said tank port in a regulating manner for implementing the feed function.

9. A pressure-limiting valve according to claim 5 wherein said valve pilot control is openable;
said pressure-limiting valve piston is movable away from said working port; and
said check-valve piston is movable to follow movement of said pressure-limiting valve piston until respective travel stops in said valve housing are contact by said pistons and subsequently said pressure-limiting valve piston enables fluid communication between said working port and said tank port in a pressure-limiting manner.

10. A pressure-limiting valve according to claim 1 wherein said pressure-limiting valve piston and said check-valve piston are independently movable in said valve housing and are releasably contactable with one another.

11. A pressure-limiting valve according to claim 10 wherein
said cylindrical receiving space is inside said pressure-limiting valve piston.

12. A pressure-limiting valve according to claim 1 wherein
said cylindrical receiving space is inside said pressure-limiting valve piston.

13. A pressure-limiting valve according to claim 2 wherein said pressure-limiting valve piston and said check-valve piston contact one another adjacent to and aligned with said tank port.

14. A pressure-limiting valve according to claim 13 wherein said check-valve piston has a hollow interior opening to said working port at an axial end thereof and to said pressure-limiting valve piston at an opposite axial end thereof.

15. A pressure-limiting valve according to claim 1 wherein said pressure-limiting valve piston is biased by a setting spring having a spring force that is adjustable.

* * * * *